United States Patent [19]

Kuranaga

[11] Patent Number: 5,044,957

[45] Date of Patent: Sep. 3, 1991

[54] SET OF DEVICES FOR FABRICATING COLORED PLASTIC PICTURES OR PRODUCTS AND METHOD OF FABRICATING COLORED PLASTIC PICTURES OR PRODUCTS WITH USE THEREOF

[75] Inventor: Ikuo Kuranaga, Saitama, Japan

[73] Assignee: AIKO Co., Ltd., Saitama, Japan

[21] Appl. No.: 598,818

[22] Filed: Oct. 17, 1990

Related U.S. Application Data

[63] Continuation of Ser. No. 381,660, filed as PCT JP88/01084 on Oct. 26, 1988, published as WO89/03773 on May 5, 1988, abandoned.

[30] Foreign Application Priority Data

Oct. 28, 1987 [JP] Japan ................................ 62-270068

[51] Int. Cl.⁵ ................................ G09B 11/00

[52] U.S. Cl. ................................ 434/82; 273/DIG. 5; 446/268

[58] Field of Search ................................ 434/82, 84, 88, 81; 273/DIG. 5; 446/268, 146; 428/90

[56] References Cited

U.S. PATENT DOCUMENTS

| | | | |
|---|---|---|---|
| 2,502,926 | 4/1950 | Chadwick et al. | 428/90 X |
| 2,710,046 | 6/1955 | Markus et al. | 156/267 X |
| 2,716,828 | 9/1955 | Adler | 428/17 |
| 3,870,591 | 3/1975 | Witman | 273/DIG. 5 |

FOREIGN PATENT DOCUMENTS

| | | |
|---|---|---|
| 55-2613 | 1/1980 | Japan . |
| 55-82700 | 6/1980 | Japan . |

OTHER PUBLICATIONS

*Playthings;* "The House that Games Built' Has New Ones"; Mar. 1970; p. 217.

*Modern Plastics;* "Bake a Picture"; vol. 39, No. 1; Sep. 1961; pp. 100–102.

*Primary Examiner*—Richard J. Apley

*Assistant Examiner*—Rachel M. Healey

*Attorney, Agent, or Firm*—Stevens, Davis, Miller & Mosher

[57] ABSTRACT

A set of devices for fabricating a novel, soft, sheet-like colored plastic picture or a product which adheres on a window glass, a tile, or a wall and may be enjoyed as an indoor decoration, or may be utilized as a coaster or a pendant, and a method of fabricating a colored plastic picture or a product with use thereof. The set of devices includes a metal plate (1), colored vinyl chloride resin material (4) in sol state contained in a squeeze tube, and a hot plate (3). After the sol state colored vinyl chloride resin material is extruded from a tube (4) onto a rough sketch (2) drawn on the metal plate (1) of the set of devices, so as to paint the picture (c) (d), the metal plate is put on a hot plate (3) to be heated, so as to gel the colored vinyl chloride resin, and the gelled colored chloride resin is removed from the metal plate after cooling, thereby fabricating the colored plastic picture or product.

2 Claims, 6 Drawing Sheets

FIG. 2(e)
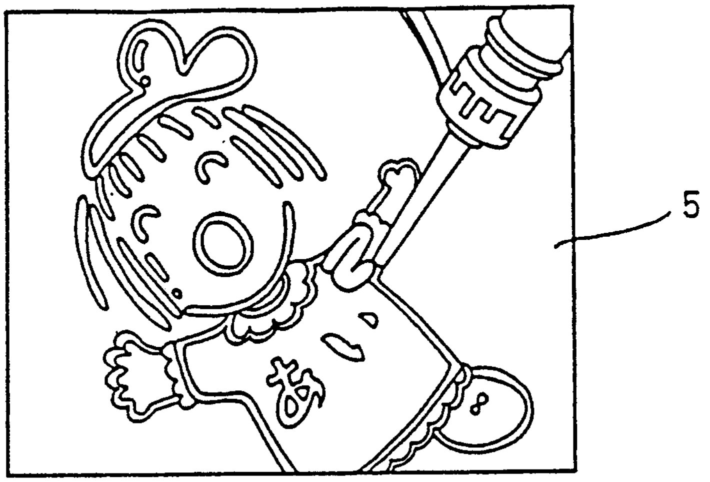
FIG. 2(f)
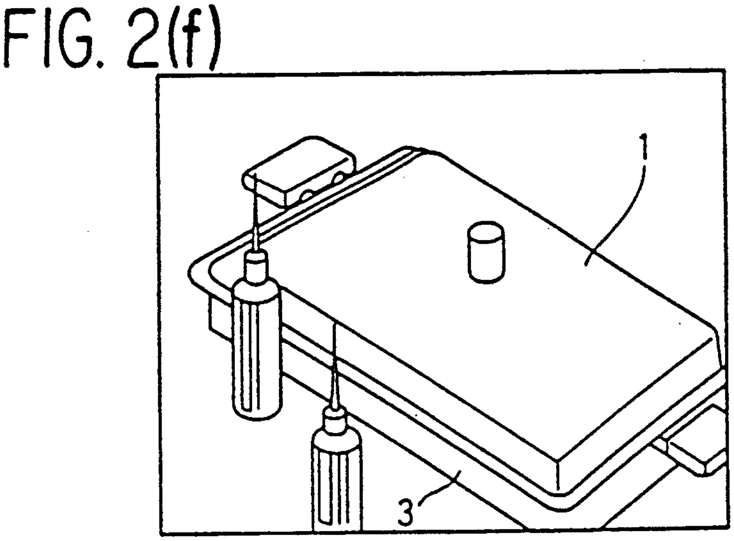
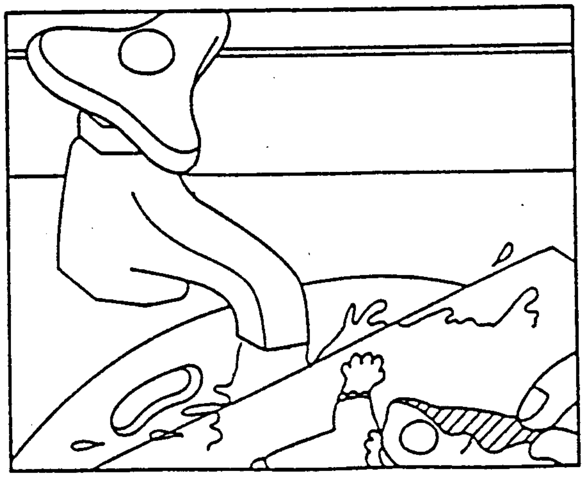
FIG. 2(g)

SET OF DEVICES FOR FABRICATING COLORED PLASTIC PICTURES OR PRODUCTS AND METHOD OF FABRICATING COLORED PLASTIC PICTURES OR PRODUCTS WITH USE THEREOF

This application is a continuation of application Ser. No. 381,660, filed as PCT JP88/01084 on Oct. 26, 1988, published as WO89/03773 on May 5, 1989, abandoned.

TECHNICAL FIELD

This invention relates to a novel set of devices for fabricating a soft plastic picture or a product which adheres on a window glass, a tile, or a wall so as to be enjoyed as an indoor ornament, and which is also utilized as a coaster or a pendant, and a method of fabricating the colored plastic picture or a product with use of such devices.

BACKGROUND ART

Heretofore, a line drawing for coloring has been widely known as a playing or a teaching material for young children. As generally known, the line drawing for coloring includes a paper of rough sketch on which only picture patterns are drawn. The rough sketch is painted with coloring material such as pigment or crayon, so as to arouse interest in paintings with fun, and to develop emotion.

On the other hand, various colored plastic merchandises are put on the market regardless of softness or hardness; for instance, toys, dolls, artificial flowers, artificial fruit, and other products are popular. Those colored plastic goods are manufactured by applying heat or pressure, or both at the same time to a colored plastic material by an injection molding method, a compression molding method, or an extrusion molding method with use of moldings in a predetermined shape.

However, since they are fabricated by the above mechanical molding methods, configurations of the products fabricated with the above-mentioned conventional colored plastic material are uniformalized by the employed moldings, and the color tone thereof is almost monotonous, so that only monotonous products can be obtained.

The present invention was developed in view of the above-described situation of the conventional products, and its object is to provide a set of devices for making up totally novel, soft, colored plastic-made pictures or products, to which desired patterns are drawn and which are painted with desired colors, with use of the colored plastic materials by outline drawing for coloring or usual drawing, and a method of manufacturing the colored plastic pictures or products with use of such devices.

DISCLOSURE OF INVENTION

According to an aspect of the present invention, there is provided a set of devices for making up the colored plastic pictures or products, wherein a protruded picture of colored vinyl chloride resin as the rough sketch is formed on the front face of a sheet of vinyl chloride resin, the sections surrounded by the protruded picture are painted with transparent or/and colored vinyl chloride resin, characterized in that said set of devices comprises a metal plate, colored vinyl chloride resin material in a sol state contained in a squeeze tube for paint the rough sketch drawn on said metal plate, and a hot plate for heating to gel a picture drawn in said sol state colored vinyl chloride resin material.

According to another aspect of the present invention, there is provided a method of fabricating the colored plastic pictures and products, characterized in that it comprises the steps of extruding sol state colored vinyl chloride resin material from a squeeze tube onto a rough sketch drawn on a metal plate to paint a picture, locating the metal plate on a hot plate, heating the same so as to gel the sol state colored vinyl chloride resin, and removing the gelled colored vinyl chloride resin from the metal plate after cooling.

According to the present invention, since the rough sketch made on the metal plate is bordered by the colored vinyl chloride resin, the picture can be easily painted inside the border by extruding the sol state colored vinyl chloride resin material from the tube without overflowing of the material.

Also, even a person who is poor at drawing is able to easily draw a picture since the rough sketch of desired pattern of design can be transcribed onto the transparent sheet of vinyl chloride resin by drawing the rough sketch on the transparent sheet of vinyl chloride resin and bordering the rough sketch with the colored vinyl chloride resin.

Furthermore, it is possible to make a rough sketch on the colored vinyl chloride resin sheet and to border the rough sketch with the colored vinyl chloride resin. Particularly, a colored plastic picture or a good possessing enamel color can be made up when the rough sketch is drawn on a white sheet of colored vinyl chloride, the rough sketch is bordered by the colored vinyl chloride resin, and translucent colored vinyl chloride resin of sol state is applied on said white sheet of vinyl chloride resin.

The colored plastic picture or product fabricated in the above-described method possesses a soft sheet of vinyl chloride resin, on a front face of which sheet a protruded pattern of colored vinyl chloride resin is formed, and the sections surrounded by said convex pattern are painted with transparent or/and colored vinyl chloride resin while the back face of the sheet is shaped flat, so that the back face can be tightly attached to a flat portion of a window glass, a door, a tile, or a wall, to be utilized as indoor decorations. If the surface on which the back face is to be attached is rough, bonding agent or pressure sensitive adhesive may be used as required.

Furthermore, a metallic ring or a crip may be provided at the top part of the picture during bordering, fabricating of vinyl chloride resin sheet, or painting with sol colored vinyl chloride resin of the above process of fabrication, so that the fabricated good may be used as a pendant.

BEST MODE FOR CARRYING OUT THE INVENTION

Figure 1A:
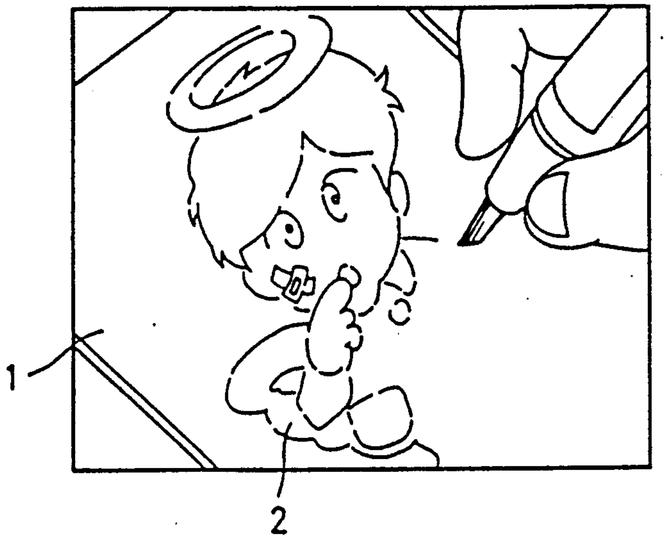
FIGS. 1 (*a*)-(*f*) are a series of process diagrams showing an example of the method of making a colored plastic picture or a product according to the present invention.
Figure 1B:
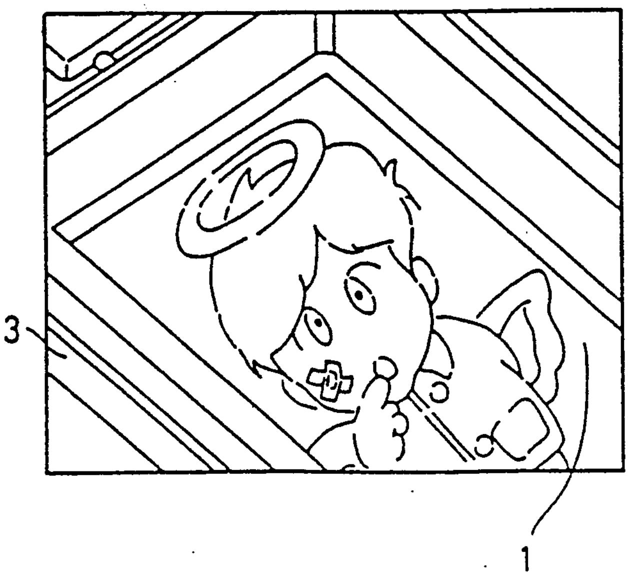
Figure 1C:
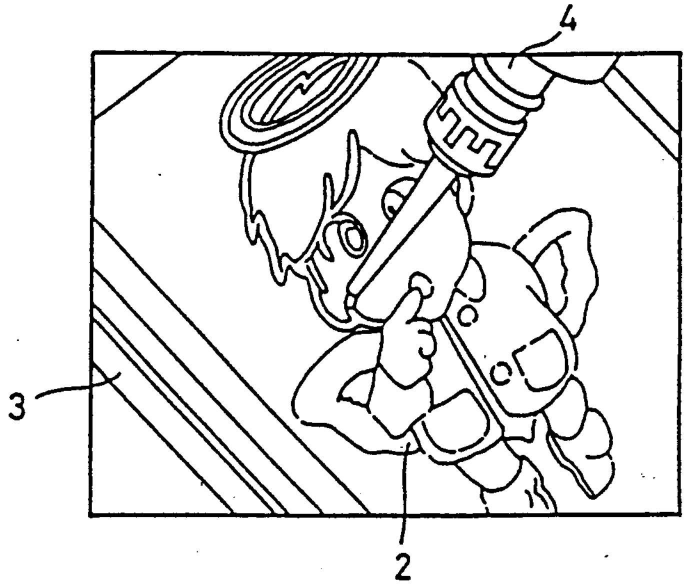
Figure 1D:
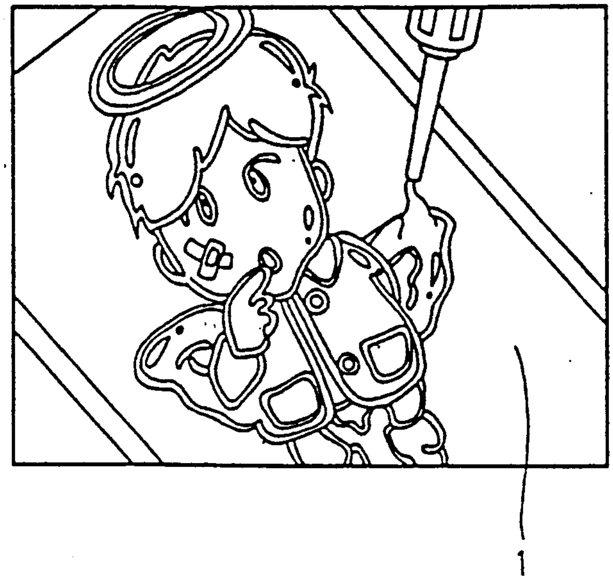
Figure 1E:
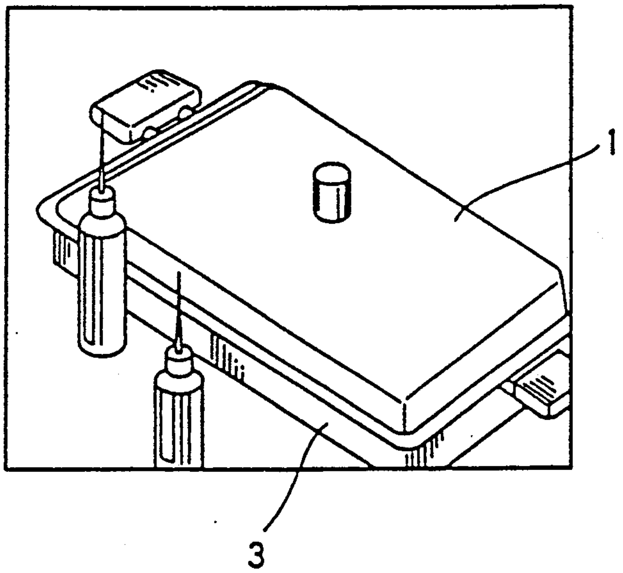
Figure 1F:
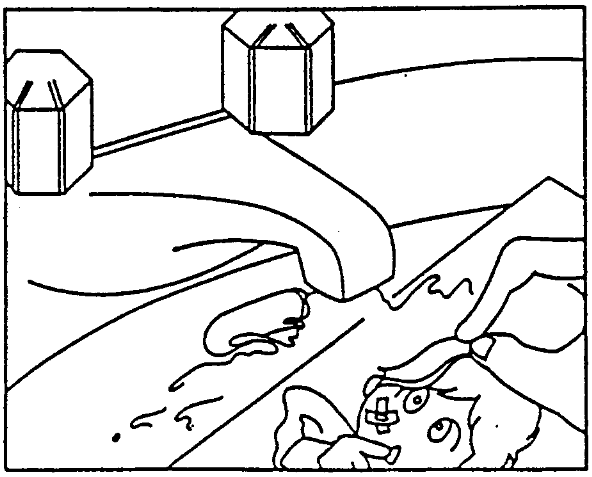

Now, the present invention will be described in detail.

A set of devices for making a colored plastic picture or a product according to the present invention can easily make a picture or an article by drawing a picture on a metal plate by squeezing sol (liquid) colored vinyl chloride resin from a squeeze tube, and heating the picture on a hot plate, thereby gelling the resin.

According to the present invention, the colored vinyl chloride resin material in a sol state is contained in a squeeze tube, and may be colored with opaque primary color such as red, blue, green, white or black, or translucent color such as pink, blue, yellow or green, or transparent color.

The sol translucent colored vinyl chloride resin material is desired to be the resin having 100 parts by weight of transparent vinyl chloride resin and 0.05–3 parts by weight, preferably 0.1–1 parts by weight, of colored vinyl chloride resin, combined. When such a sol translucent colored vinyl chloride resin material is applied to adhere to the white vinyl chloride resin, the vinyl chloride resin of enamel color can be obtained.

The color of the colored vinyl chloride resin material is not limited to those described just above, and any color may be employed.

The metal plate is utilized for a rough sketch, in painting with sol colored vinyl chloride resin material and in heating on the hot plate, and any metal is satisfactory as long as it resists rust. For example, aluminum sheet or stainless sheet is preferable.

The hot plate is employed for gellation of a picture drawn with sol colored vinyl chloride resin from the squeeze tube, so as to make a picture or an article, and heating means therefor is preferably electrical one.

A method of making a colored plastic picture or an article according to the present invention will now be explained.

First, a desired rough sketch is drawn on the metal plate in quick drying ink, and the metal plate is put on the hot plate of approximately 150° C. for one to two minutes for heating. The rough sketch may be freely drawn by drawer's preference or choice. It is also feasible to transcribe the original picture onto the metallic plate by interposing a carbon paper between the sheet of original picture and the metallic plate.

Then, the sol colored vinyl chloride resin material is applied along the picture or a pattern of the rough sketch using conventional means 4, such as a squeeze tube, thereby bordering the picture or the pattern, with the metal plate being left as it is. After that, the metal plate is removed from the hot plate and cooled.

The bordering may be carried out by attaching a flexible rod or a string on the metal plate along the line of the rough sketch or the pattern.

Another way of bordering is as follows: the metal plate is put on the hot plate, a large square border is made thereon, transparent or colored vinyl chloride resin in a sol state is applied thinly inside the border after cooling, the metal plate is heated again by the hot plate so as to gel the resin, and then cooled to obtain a sheet of vinyl chloride resin. After a rough sketch is drawn on said sheet by a ball-point pen or the like, the metal plate is heated on the hot plate, and the bordering of the rough sketch is carried out with the sol colored vinyl chloride resin from the tube.

Then, the picture is painted, i.e., the sol colored vinyl chloride resin of desired color is applied to the sections surrounded by the borders of the rough sketch which is made in the above-described process.

The metal plate on which the picture has been painted is set on the hot plate and heated at a temperature between about 140° C. and 180° C. for five to twenty minutes to gel the resin. After cooling with water or the like, the gelled soft sheet-like colored vinyl chloride resin is removed from the metal plate, whereby the colored plastic picture or a product is obtained.

The colored plastic picture or a product fabricated in the above-described method possesses a soft sheet of vinyl chloride resin, on a front face of which sheet a protruded pattern of colored vinyl chloride resin is formed, and the sections surrounded by said protruded pattern are painted with transparent or/and colored vinyl chloride resin while the back face thereof is shaped flat, so that the back face may be tightly attached to a flat portion of a window glass, a door, a tile, or a wall, to be utilized as an indoor decoration.

Further, a metallic ring or a crip may be provided to an upper part of the picture in bordering, fabricating of vinyl chloride resin, or painting with sol colored vinyl chloride resin of the above process of fabrication, so that the fabricated product may be utilized as a pendant.

EXAMPLES

Hereunder, the present invention will be described in more concrete manner with reference to the examples thereof.

Example 1

FIGS. 1(*a*)–(*f*) are a series of process diagrams showing one example of a method of making a colored plastic picture or a good according to the present invention. This example will be explained with reference to the accompanying drawings.

A rough sketch 2 of desired character (person) is drawn on an aluminum plate 1 with quick drying ink (see FIG. 1(*a*)).

Next, the aluminum plate 1 is put on a hot plate 3 which has been heated to 170° C., so as to be heated one minute (see FIG. 1(*b*)).

After one minute has elapsed, sol colored vinyl chloride resin is extruded from a squeeze tube 4 along the lines of the rough sketch 2, thereby bordering the rough sketch (see FIG. 1(*c*)).

After the aluminum plate is removed from the hot plate and cooled for about three minutes, the picture is completed by the squeeze tubes of sol state various colored vinyl chloride resins (see FIG. 1(*d*)).

The picture so painted and the aluminum plate 1 are placed together on the hot plate 3 of 170° C. and a lid is put thereon for heating about ten minutes (see FIG. 1(*e*)).

Then, the aluminum plate 1 is removed from the hot plate 3 and water-cooled, and the gelled resin is gently removed, whereby a colored plastic picture or a good is obtained (see FIG. 1(*f*)).

The product so obtained is a soft, thin sheet-like product and can be attached on the glass of the window, so that it is very suited as the ornament.

Example 2

FIGS. 2(*a*)–(*g*) are a series of process diagrams showing another example of the method of making a colored plastic picture or a good according to the present invention. The illustrated example will be explained with reference to the accompanying drawings.

First, a clear sheet is formed. The aluminum plate 1 is put on the hot plate 3 of about 170° C., and a large square border is drawn on the aluminum plate by a tube of sol state, white vinyl chloride resin (see FIG. 2(a)).

Next, the aluminum plate 1 is taken out from the hot plate 3 and cooled for about three minutes. A tube of sol transparent vinyl chloride resin is squeezed to thinly apply the transparent resin inside the border with a brush or a spatula, and the aluminum plate 1 is returned onto the hot plate 3 of approximately 170° C. so as to be heated about five minutes. Finally, the aluminum plate is cooled with water and the clear sheet 5 is gently removed therefrom (see FIG. 2(b)).

The clear sheet 5 is placed to cover the character which is drawn by the fabricator, and the rough sketch 2 is transcribed by a ball-point pen or the like. After that, the clear sheet is put on the hot plate of about 170° C. for one-minute heating (see FIG. 2(c)).

Figure 2A:
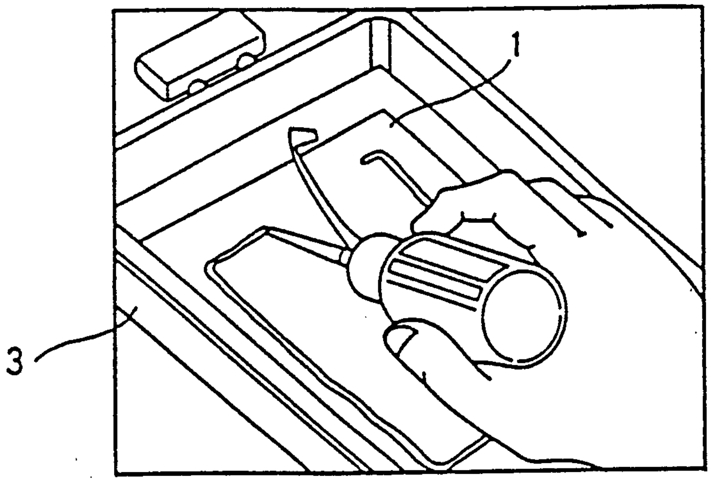
FIGS. 2(*a*)-(*g*) are a series of process diagrams showing another example of the present invention.
Figure 2B:
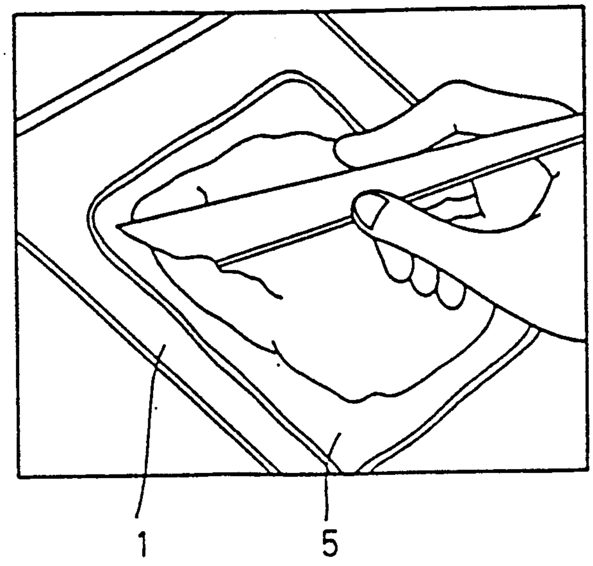
Figure 2C:
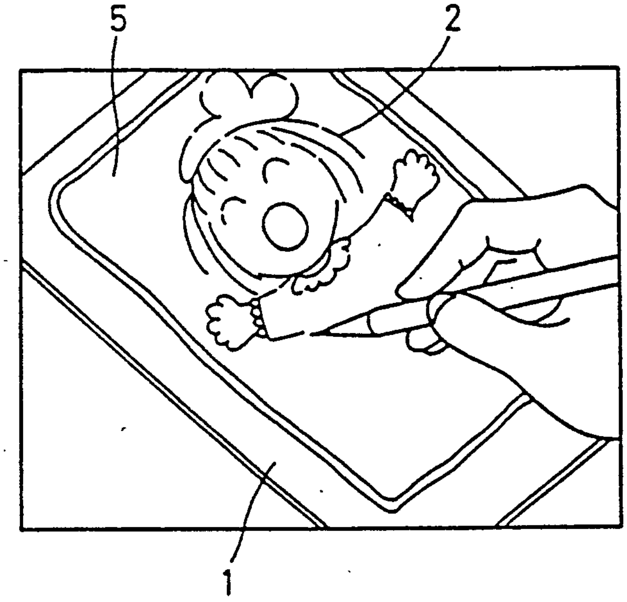
Figure 2D:
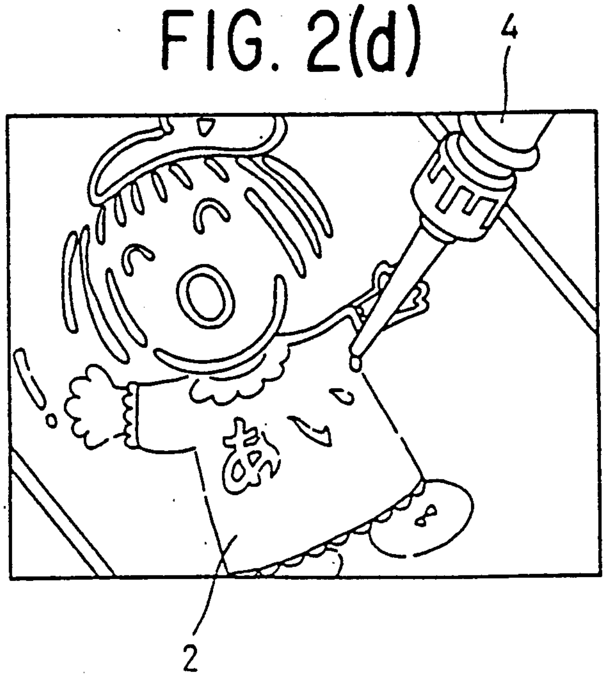

After one minute has elapsed, bordering along the line of the rough sketch 2 is carried out by a tube 4 of sol, white vinyl chloride resin with the clear sheet being kept as it is, and the sheet is heated five minutes (see FIG. 2(d)).

After setting the hot plate 3 to approximately 100° C., various colored vinyl chloride resins in sol state are applied from the squeeze tubes onto the draft (see FIG. 2(e)).

Then, the lid is put on, and the hot plate 3 is heated to 170° C. and kept as it is for about fifteen minutes (see FIG. 2(f)).

The aluminum plate 1 is taken out from the hot plate 3. The gelled resin is gently removed from the plate after water-cooling, and the outer portion is cut off with, for example, scissors, whereby, a colored plastic picture or a product is obtained (see FIG. 2(g)).

According to this particular example, even a person who is not good at drawing can draw a picture by transcribing the picture on the clear sheet. Also, it is easy to depict a relief figure.

Example 3

First, a white color sheet is formed. The aluminum plate is put on the hot plate which has been heated to about 170° C., and a large square border is drawn thereon by a tube of sol state, white vinyl chloride resin. Then, the aluminum plate is taken out from the hot plate and cooled for about three minutes. The sol state, white vinyl chloride resin is squeezed out of the tube to thinly apply inside the border with a brush or a spatula, and the aluminum plate is returned onto the hot plate of approximately 170° C. and heated for about five minutes. Finally, the aluminum plate is cooled with water and the white sheet is gently removed therefrom.

The rough sketch is drawn on the white sheet with a ball-point pen or the like, and the sheet is put on the hot plate of about 170° C. for one-minute heating.

After one minute has passed, bordering along the line of the rough sketch is carried out by a tube of sol, white vinyl chloride resin with the white sheet being kept as it is, and the sheet is heated for five minutes.

After removing the aluminum plate from the hot plate and cooling the same for about five minutes, the translucent colored vinyl chloride resin in sol state is thinly applied with a brush or a spatula. Then, the temperature of the hot plate is raised to 170° C. and the aluminum plate is heated for about fifteen minutes.

The aluminum plate is taken out from the hot plate and cooled with water. The gelled resin is gently removed from the plate, and the outer portion is cut off with scissors or the like, whereby an enamel-colored, soft plastic picture or a product is fabricated.

According to this particular example, the color of earthenware is easily obtained by a brush-painting.

INDUSTRIAL APPLICABILITY

As described above, according to the novel set of devices for fabricating the colored plastic picture or a product and the method of fabricating the colored plastic picture or a product with use thereof, a colored plastic picture or a product can be easily fabricated, which possesses a predetermined image, by heating the picture drawn with the colored vinyl chloride resin of sol state by the hot plate.

Moreover, the colored plastic picture or product so fabricated adheres to the window glass, the tile, or the wall, so that it may be enjoyed as the ornament. Further, it may be utilized as a coaster or a pendant, enriching the life.

What is claimed is:

1. A method of making a colored, soft, thin sheet like plastic article comprising drawing a rough sketch of the desired design on a metal plate in quick drying ink;

carrying out a first heating of the metal plate;

while heating, applying a sol colored vinyl chloride resin material along the pattern of the rough sketch using a squeeze tube to border the design thereon;

removing the resin material-treated metal plate from the heat source and cooling;

painting the resin material-bordered sketch with sol colored vinyl chloride resins of the desired colors in the sections of the sketch bordered to fill in the sketch;

carrying out a second heating of the metal plate to gel all the sol colored vinyl chloride resin materials applied;

cooling the treated metal plate to set the gelled resin materials; and removing the gelled soft sheet-like colored vinyl chloride resin material article from the metal plate.

2. A method of making a colored, soft, thin sheet-like plastic article comprising transcribing a picture onto a metal plate by interposing carbon paper between the picture and the metal sheet and tracing the pattern of the picture onto the metal sheet;

carrying out a first heating of the metal plate;

while heating, applying a sol colored vinyl chloride resin material along the pattern of the picture using a squeeze type to border the design thereon;

removing the resin material-treated metal plate from the heat source and cooling;

painting the resin material-bordered picture with sol colored vinyl chloride resins of the desired colors in the sections of the picture bordered to fill in the picture;

carrying out a second heating of the metal plate to gel all the sol colored vinyl chloride resin materials applied;

cooling the treated metal plate to set the gelled resin materials; and removing the gelled soft sheet-like colored vinyl chloride resin material article from the metal plate.

* * * * *